United States Patent [19]

Austin

[11] Patent Number: 5,034,041
[45] Date of Patent: Jul. 23, 1991

[54] TENT-FREE APPARATUS FOR PARTICULATE CONTAMINATION CONTROL

[75] Inventor: Garey Austin, Muscle Shoals, Ala.

[73] Assignee: Tennessee Valley Authority, Muscle Shoals, Ala.

[21] Appl. No.: 546,266

[22] Filed: Jun. 26, 1990

[51] Int. Cl.$^5$ .............................................. B01D 50/00
[52] U.S. Cl. .............................. 55/385.1; 144/252 R; 30/166.3
[58] Field of Search ................ 409/137; 144/252 R, 144/252 A; 408/710; 55/385.1; 30/166.3

[56] References Cited

U.S. PATENT DOCUMENTS

2,339,324  1/1944  Fischer ........................... 144/252 R
3,837,383  9/1974  Ko .................................. 144/252 R Primary Examiner—Bernard Nozick
Attorney, Agent, or Firm—Robert A. Petrusek

[57] ABSTRACT

A tent-free technique, system, and apparatus for effecting protection of humans from airborne asbestos and other particulate contamination is disclosed. It comprises a first transparent cowling means operatively associated with drilling means and at least one filtration unit flow connected therewith. The first cowling means comprises two members slidably disposed relative to one another, with the first member thereof being more or less substantially fixed relative to the drilling means housing and the second member adapted to be more or less substantially fixed temporarily to the plane of the material first engaged by the drill bit. A second cowling means, also flow connected to said filtration unit, is operatively associated with the instant apparatus and more or less substantially fixed temporarily to the plane of the material lastly engaged by said drill bit. A third cowling means is operatively associated with sawing means and fixed relative to the housing thereof and adapted for enclosing the saw blade. The cowlings can be made and retrofitted into existing drills and/or saws. The drill with first cowling member attached is positioned relative to said second member and inserted thereinto and the drill bit is properly positioned by means of the transparent nature of the resulting composite first cowling. Said second cowling means is placed onto the desired location on the opposite side of the material to be drilled, usually by hand holding effected by the drill operator helper and the drilling operation is commenced. The sawing means is utilized with said third cowling attached and with said second cowling in place on the opposite side of said material.

14 Claims, 3 Drawing Sheets

Fig. 3

TENT-FREE APPARATUS FOR PARTICULATE CONTAMINATION CONTROL

The invention described herein may be manufactured and used by or for the Government for governmental purposes without the payment to me of any royalty therefor.

INTRODUCTION

The present invention relates to a new, novel, safe and relatively simple and inexpensive, as well as highly efficient method and means for dealing with the serious dangers associated with the inhalation of particulate material suspended in the air environment generally surrounding human operators who are called upon from time to time to repair, maintain, machine, cut, or otherwise modify structures containing asbestos or other dangerous and highly friable materials, including ebony-asbestos boards upon which are mounted, or will be later mounted, a wide variety of electrical components. It is well know that any machining operation performed on such materials will give rise to an air-particulate suspension classified as a carcinogenic hazard to humans and animals, which suspension will encompass both the immediate area juxtaposed said machining operation as well as the surrounding areas. In the instance of machining materials containing asbestos, it is well documented that the resulting disturbances will produce an area highly contaminated with very fine particles comprised of fibers (including those less than several tenths of a micron in diameter) which may remain suspended in the surrounding air for several days or more. Likewise, disturbances, including drilling, sawing, and the like of a variety of other highly friable materials will oftentimes produce an environment comprised of highly dangerous and offending air suspended particulate contamination.

Accordingly, in order to ensure the requisite degree of protection for the workers who are called upon to effect such machining operations, it has heretofore been necessary for such persons to wear protective clothing and to use appropriate breathing/filtering apparatus. As is well appreciated by those operators who have had the occasion to dress in such protective suits, same are very uncomfortable in which to work and are extremely awkward when it is necessary to perform operations requiring any substantial degree of manual dexterity. In addition, in order to protect the surrounding areas not immediately juxtaposed such disturbed area, and more particularly the persons who need to work therein during periods of time coincident with, or shortly after such drilling and/or sawing or the like, such areas generally surrounding the immediate work area must be sealed off and physically isolated from such disturbed environment. This isolation is oftentimes accomplished by the erection of "tents" usually comprised of thin plastic film. Moreover, in order to fully ensure that the airborne asbestos fibers or other dangerous particulates remain so isolated and do not find their way out of discontinuities in such tents, such as apertures provided for operator ingress/egress, the resulting tent must be maintained with a negative pressure effected by utilization of air filtration units flow connected with such tent enclosure. Even such precautions are oftentimes inadequate and require in combination therewith the utilization of decontamination chamber areas as well as mechanical sealing means for utilization with or over said ingress/egress apertures, which sealing means may include water filled troughs or other specially designed barriers and flaps.

As is appreciated by those skilled in this art, there are oftentimes instances wherein machine operations are to be performed on a variety of in-place support units, including vertically disposed ebony-asbestos boards contained in electric utility switch houses and other distribution structures. Although modifications thereto usually require only minimal drilling and/or cutting prior to the actual placement of additional or replacement components, all of the above precautions have heretofore been necessary in order to ensure the health and safety considerations due the workers involved and required by various OSHA requirements. Thusly, both the time and resulting costs, which are normally associated with such otherwise simple tasks, are greatly exaggerated.

The present invention overcomes the many undesirable restrictions and characteristics of the best available and currently practiced state of the art relating to the serious dangers associated with persons breathing such particulate contaminated air; as described supra, and eliminates the requirements for both the use of full protective clothing, by persons called upon to perform such disturbances upon asbestos containing materials, and more importantly the requirement to construct protective enclosures, including tents around the work area.

As indicated herein, a principal feature of the instant invention incorporates the use of a plurality of cowling means which are utilized to effect barriers between the source generating a high degree of offending particulate contamination, such as drill bits or saw blades that, respectively, provide apertures or cuts in materials such as asbestos or asbestos containing boards or the like, which particulate contamination normally would become airborne and quickly spread throughout the area in which such machine operations occur, and such surrounding area that otherwise would be environmentally in communication with such source. Such cowling means generally are elongated and may be of a number of forms and shapes, including cylindrical for the best and most efficient resistance to air pressure differential forces applied thereto. They may be constructed of a variety of materials including metal, or more preferably plastic of the high impact type. Generally, they are shroud-like, comprised of relatively thin material in order to reduce the weight added by the use thereof, and are at least partially constructed of transparent material to facilitate orientation by the operator, of the specific machine tool; e.g., drill bit, saw blade, etc., relative to the target work area. Although in the instances herein described, the operator is human; situations in which a robotic device is substituted for a human are also contemplated, albeit, the necessary protection would be primarily for the benefit of persons occupying the adjacent areas, etc. Although generally elongated, hollow, and free of obstacles or interior structures, in order to facilitate the free flow of sweep air therethrough, they may be provided with interiors molded or otherwise shaped to direct or otherwise streamline such airflow. Thus, whenever the term "cowling" or "cowling means" is used herein it is intended and understood that such terms apply to, or describe such types of structures or apparatus.

As also indicated herein, the instant invention comprises apparatus and systems as well as a process for the practice thereof which is tent-free in the sense that no structures, such as tents comprised of relatively thin membranes of plastic material or the like are, or need to be erected over or about the area surrounding both the source generating such a high degree of offending particulate contamination and the area required for manipulation by the human operators who are called upon, from time to time to perform the required machine operations. Examples of requirements for such tent structures, which the present invention substantially eliminates, may be found in the teaching of U.S. Pat. No. 4,604,111, Natale, Aug. 5, 1986, elsewhere herein incorporated by specific reference thereto. Thus, whenever the term "tent-free" is used herein, it is intended and understood that such term applies to or describes apparatus or systems, as well as the practice of processes which eliminate the use or requirement for use or utilization of such types of structures or apparatus over the immediate work area as well as the generally surrounding work area normally occupied by human operators and attendant equipment which may be used in the performance of such modifications/machine operations.

As also indicated herein, the instant invention comprises apparatus and systems as well as a process for the practice thereof which oftentimes performs such modifications, including drilling and sawing on plate-like members comprised of asbestos, asbestos containing materials, or the like and which members are oftentimes characterized as being friable such that any substantial mechanical disturbances resulting from such drilling and/or sawing gives rise to the incidence of copious amounts of very fine or small particulates, including fibers in the case of asbestos boards, which quickly become airborne and remain so for substantial periods of time. Such plate-like members oftentimes take the form and shape of relatively thin and flat boards which may have a variety of electrical components mounted thereon and oftentimes are disposed in generally vertical orientations, as found in electrical utility substations and switch houses. However, they may take other forms and shapes, including being provided with sides (top and bottom when horizontally disposed) which are not substantially parallel to one another. There may also be instances wherein said members take forms which can more accurately be described as block-like. Thus, whenever the term "plate-like" is used herein, it is intended and understood that such term applies to or describes apparatus of such construction or type.

BACKGROUND OF THE INVENTION

1. Field of the Invention

The present invention relates to methods and means for effecting protection of humans from the deleterious effects of airborne asbestos and other particulate contamination and involves the use of several specially designed, partially or wholly transparent cowling means operatively associated with drilling and/or sawing means. The first and second of three such cowling means are operatively associated with at least one filtration unit flow connected therewith and with a blower to pull air into the specially designed cowlings and thence into the filtration unit wherefrom the resulting filtered air is exhausted to the atmosphere. In order to accommodate the travel of the drill bit, the first cowling means operatively associated with said drilling means comprises two members slidably disposed relative to one another, with the first member thereof being more or less substantially fixed relative to the drill housing and the second member adapted to be fitted temporarily to the target side of the mounting board or other member to be drilled. In the preferred embodiment of the instant invention, said second member of said first cowling means is provided with means for effecting the flow connection with said at least one filtration unit. Normally, a second cowling means, also flow connected to said filtration unit, is operatively associated with the instant apparatus and is fitted temporarily (usually hand held by the operator or helper) to the side of the material which is opposite to that first targeted for engagement with the drill bit of said drilling means. A third cowling means, also flow connected to said filtration unit, is operatively associated with sawing or cutting means, which sawing means may be utilized after holes are drilled in the mounting board to cut therebetween. The third cowling means is generally fixed relative to the housing of said saw. One end of said third cowling means is open and adapted to fit over the base plate of the saw, normally of the saber type, and the aperture represented by said open end defines a plane substantially parallel with the plane of the target board. Likewise, one end of the second cowling is generally open ended, with the plane defined by said aperture or open end, also disposed generally parallel with such board. It is important that all three cowlings be constructed of material that is stiff, and/or resilient enough to withstand the substantial pressures that may be developed therearound due to the pressure differentials developed by operation of the associated filtration unit. It is also important to the efficient and effective operation of the instant invention that all three such cowling members or units be at least partially constructed of material which is transparent, thereby enabling the drill or saw operator to observe the positions of either the drill bit or saw blade relative to the target and to enable such operator to easily and readily effect proper orientation and/or positioning therebetween. It will also be appreciated that provisions may be made such that the flow connections with the at least one filtration unit and the first and third cowling means are arranged or constructed such that they are, or can be releasably connected therewith. In such manner, after the holes are drilled and the drill is put aside, the vacuum hose connected to the second member of the first cowling means, may be removed therefrom and connected, with the aid of suitable connecting means, to said third cowling means. Also, in the preferred embodiment of the instant invention the second cowling means and the vacuum hose operatively associated therewith, which is normally used on the backside of the board or plate to be drilled and/or sawed to capture particulate material forced therethrough by either the bit or blade, is utilized in separate combinations with either the drill or the saw. Accordingly, there usually is no need to effect a disconnection between said second cowling means and said at least one filtration unit. Thus, either three separate vacuum hoses may be used, or more preferably two vacuum hoses are utilized with a switching between the first and third cowling means being effected by releasable connecting means, if and when it is deemed desirable to follow the drilling procedure with a sawing operation. As will also be seen, two or more subhoses may be utilized to connect with said third cowling means and thence to a manifold or like device to join in flow connection with the other hose(s), usually via a trunk line, to the filtration unit.

2. Description of the Prior Art

As has been noted above, numerous prior art disclosures and practices have been incorporated into currently used procedures representing many of those taught and disclosed in a plethora of methods and/or means for ameliorating the deleterious health and personal safety considerations normally encountered in the removal and/or modification of structures or substructures constructed of materials comprising or containing asbestos or other highly friable materials which are classified as being, or presenting a carcinogenic hazard to humans.

With reference to the state of the prior art as same relates to the utilization of numerous tent-like enclosures erected or otherwise constructed over and about work areas within which asbestos, or asbestos containing materials are to be drilled, sawed, or otherwise machined, and more specifically to the utilization of negative pressures in combination therewith, and still more particularly to various modifications thereof in combination with a variety of specially designed ingress/egress aperture closure means, attention is directed to U.S. Pat. No. 4,604,111, Natale, Aug. 5, 1986, the teachings of which, along with the prior art disclosed therein, are hereby, herewith, and herein incorporated by means of this specific reference thereto.

A comparison of such prior art teachings with the disclosure of the instant invention will reveal that the instant improvement over same completely eliminates the requirement or necessity of utilizing a tent or like structure to be erected over or about the work area when asbestos type materials are to be drilled, sawed, or otherwise machined. Perhaps of equal importance, the practice of the instant invention eliminates the requirement for wearing or the necessity of utilizing full suit protective clothing and in-line respiratory devices in such work areas during the conduct of such operations.

SUMMARY OF THE INVENTION

The instant invention relates to a vastly improved technique, including methods and means for containing, lowering, and essentially eliminating the serious dangers associated with the inhalation of particulate material suspended in the air environment generally surrounding human operators who are called upon from time to time to repair, maintain, machine, drill, cut, or otherwise modify structures containing asbestos or other dangerous and highly friable materials, including ebony-asbestos boards upon which are mounted, or will be later mounted a wide variety of electrical components. It is well know that any machining operation performed on such materials will give rise to an air-particulate suspension classified as a carcinogenic hazard to humans and animals, which suspension will encompass both the immediate area juxtaposed said machining operation as well as the surrounding areas. In instances of machining materials containing asbestos, it is well documented that the resulting disturbances will produce an area highly contaminated with very fine particles comprised of fibers (including those less than several tenths of a micron in diameter) which may remain suspended in the surrounding air for several days or more. Likewise, severe mechanical disturbances, including drilling, sawing, and the like, of a variety of other highly friable materials will oftentimes produce an environment comprised of highly dangerous and offending air suspended particulate contamination.

OBJECTS OF THE INVENTION

It is therefore the principal object of the present invention to develop a new, tent-free method and means for effecting protection of humans from fine fibers of asbestos or certain other carcinogenic materials which are oftentimes rendered airborne due to substantial mechanical disturbances effected on materials constructed of and/or containing such carcinogenics.

Another object of the present invention is to provide tent-free methods and means whereby asbestos or asbestos containing boards, panels, and the like including ebony mounting panels oftentimes found in electrical utility substations can be drilled and/or cut by human operators without requiring the erection and maintenance of an environmental enclosure and barrier over the work area to seal said area from human workers occupying adjacent areas.

Still another object of the present invention is to provide tent-free methods and means whereby asbestos or asbestos containing boards, panels, and the like including ebony mounting panels oftentimes found in electrical utility substations can be drilled and/or cut by human operators without requiring the erection and maintenance of an environmental enclosure and barrier over the work area to seal said area from human workers occupying adjacent areas; and wherein the operators of such drills or saws are required only to wear half-face respirators rather than protective clothing and cumbersome air line masks.

A still further object of the present invention is to provide tent-free methods and means whereby asbestos or asbestos containing boards, panels, and the like including ebony mounting panels oftentimes found in electrical utility substations can be drilled and/or cut by human operators without requiring the erection and maintenance of an environmental enclosure and barrier over the work area to seal said area from human workers occupying adjacent areas; wherein the operators of such drills or saws are required only to wear half-face respirators rather than protective clothing and cumbersome air line masks; and wherein savings realized in reduced set-up and take-down time effected by the tent-free nature thereof are further complimented by substantially reduced contamination of the areas that normally would be enclosed in the tent enclosure currently used in the best available prior art methods and thereby effectively reduces total clean-up time as well as resulting exposure of persons to the particulate contaminated air spread throughout the confines of the tented area.

Still another object of the present invention is to provide tent-free methods and means whereby asbestos or asbestos containing boards, panels, and the like including ebony mounting panels oftentimes found in electrical utility substations can be drilled and/or cut by human operators without requiring the erection and maintenance of an environmental enclosure and barrier over the work area to seal said area from human workers occupying adjacent areas; wherein the operators of such drills or saws are required only to wear half-face respirators rather than protective clothing and cumbersome air line masks; wherein savings realized in reduced set-up and take-down time effected by the tent-free nature thereof are further complimented by substantially reduced contamination of the areas that normally would be enclosed in the tent enclosure currently used in the best available prior art methods and thereby effectively reduces total clean-up time as well as resulting exposure of persons to the particulate contaminated air spread throughout the confines of the tented area; and more importantly because the instant invention confines generated particulate contamination to extremely small areas wherefrom the resulting concentrated contamination is directly flushed to HEPA type filters, usually by means of a HEPA vacuum, actual exposure of the machine tool operators is very substantially reduced from that which they are exposed to when working within the prior art tent type enclosures.

Still further and more general objects and advantages of the present invention will appear from the more detailed description set forth below, it being understood; however, that this more detailed description is given by way of illustration and explanation only, and not necessarily by way of limitation since various changes therein may be made by those skilled in the art without departing from the true spirit and scope of the present invention.

DESCRIPTION OF THE DRAWINGS

The present invention will be better understood from a consideration of the following description taken in connection with the accompanying drawings in which.

In the more specific descriptions of the FIGURES, infra, certain components of the instant invention may be, or oftentimes are, substituted for one another. Accordingly, the index and numbering system of components is arranged by means of three-digit designations, wherein the first digit denotes the FIGURE number and the second and third digits the specific component identification. In this manner, for instance, a second cowling means, illustrated in FIG. 1, can be substantially identical with that shown in FIG. 2, thus, the designation thereof is 120 in FIG. 1 and 220 in FIG. 2. Likewise, the air filtration unit, generally illustrated at 133 in FIG. 1, is generally illustrated as 233 in FIG. 2 and 333 in FIG. 3.

Figure 1:
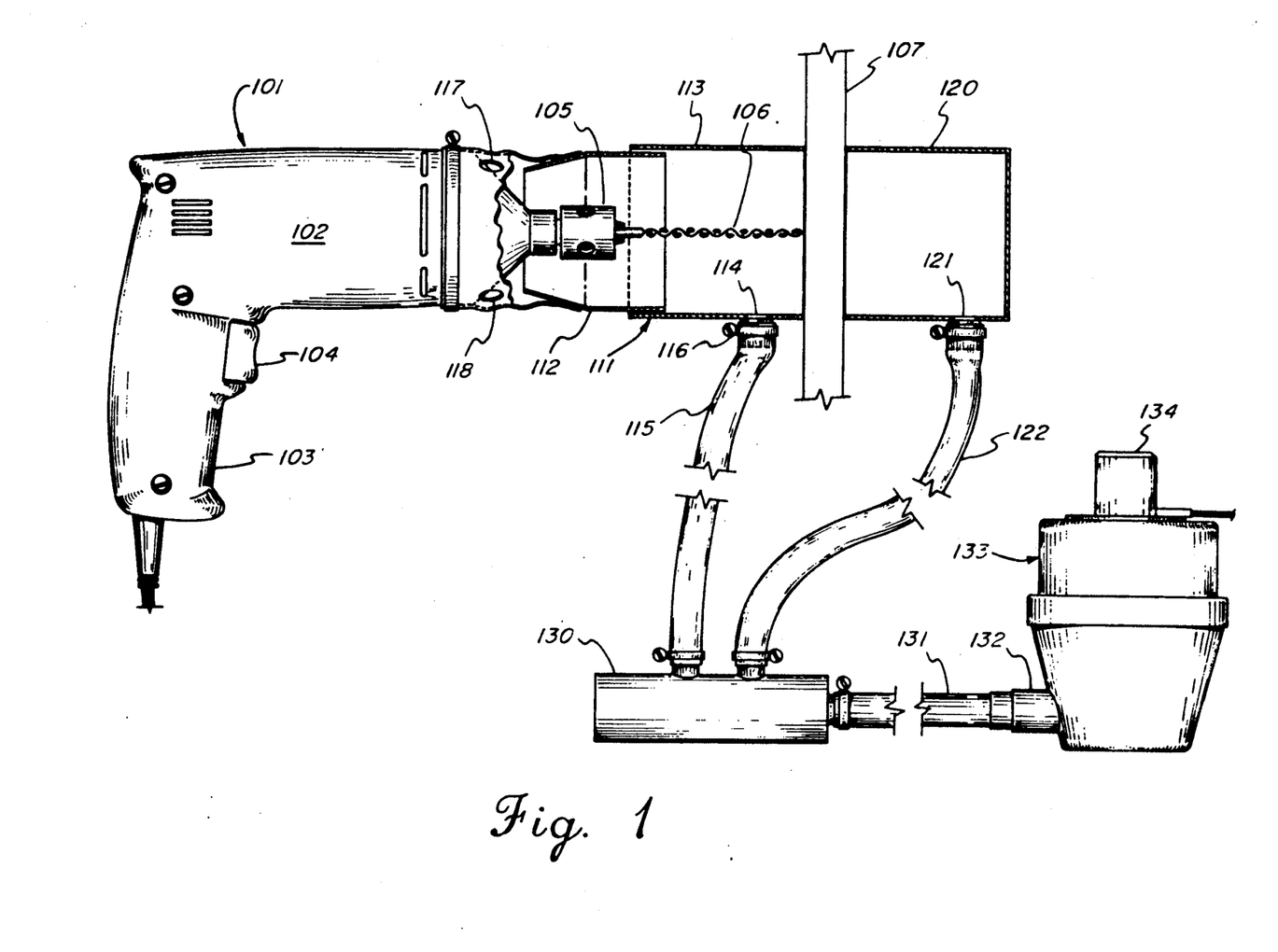
FIG. 1 illustrates, in elevation, an embodiment of the instant invention wherein drilling means is utilized in combination with first and second cowling means.
Figure 2:
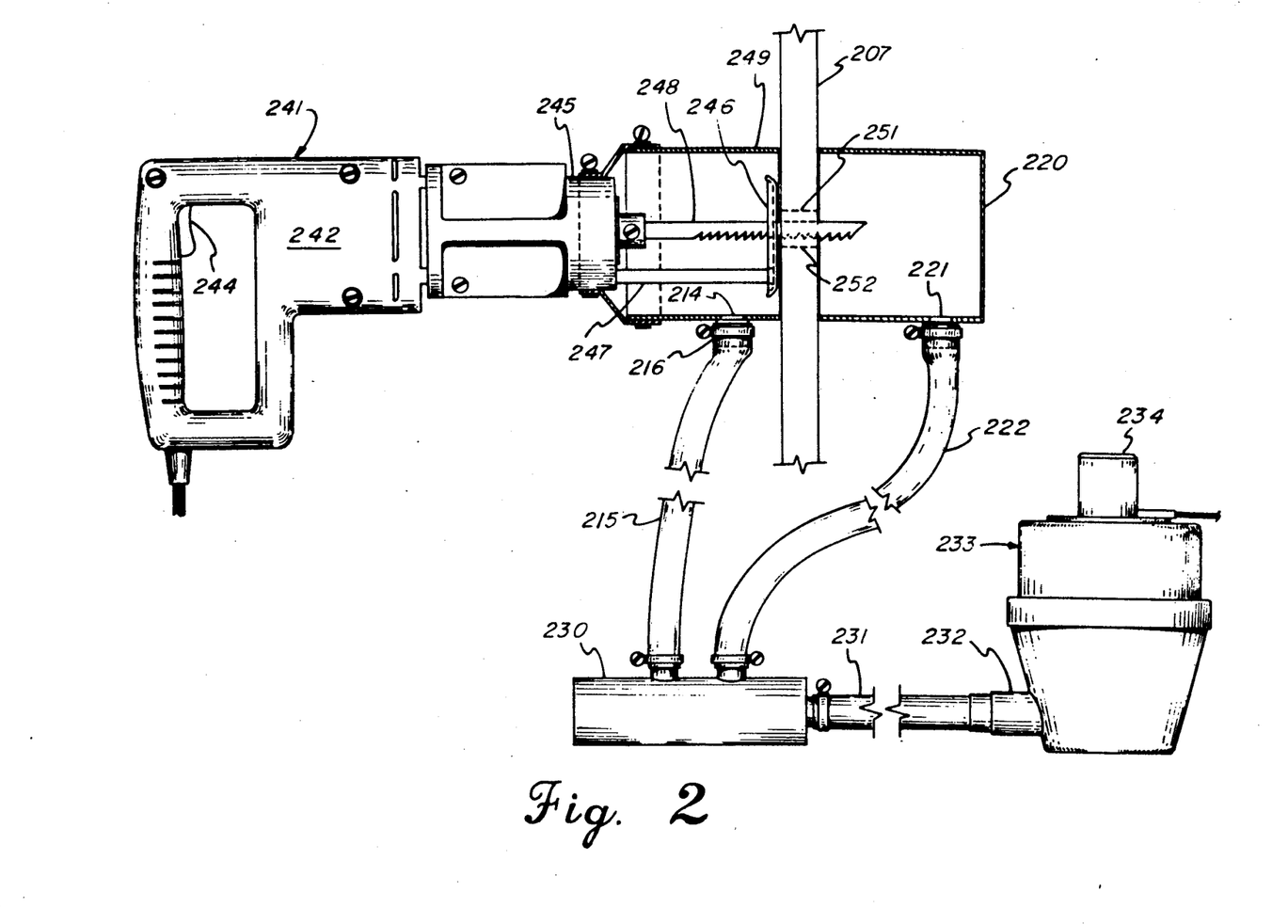
FIG. 2 illustrates, in elevation, an embodiment of the instant invention wherein sawing means is utilized in combination with third and second cowling means.
Figure 3:
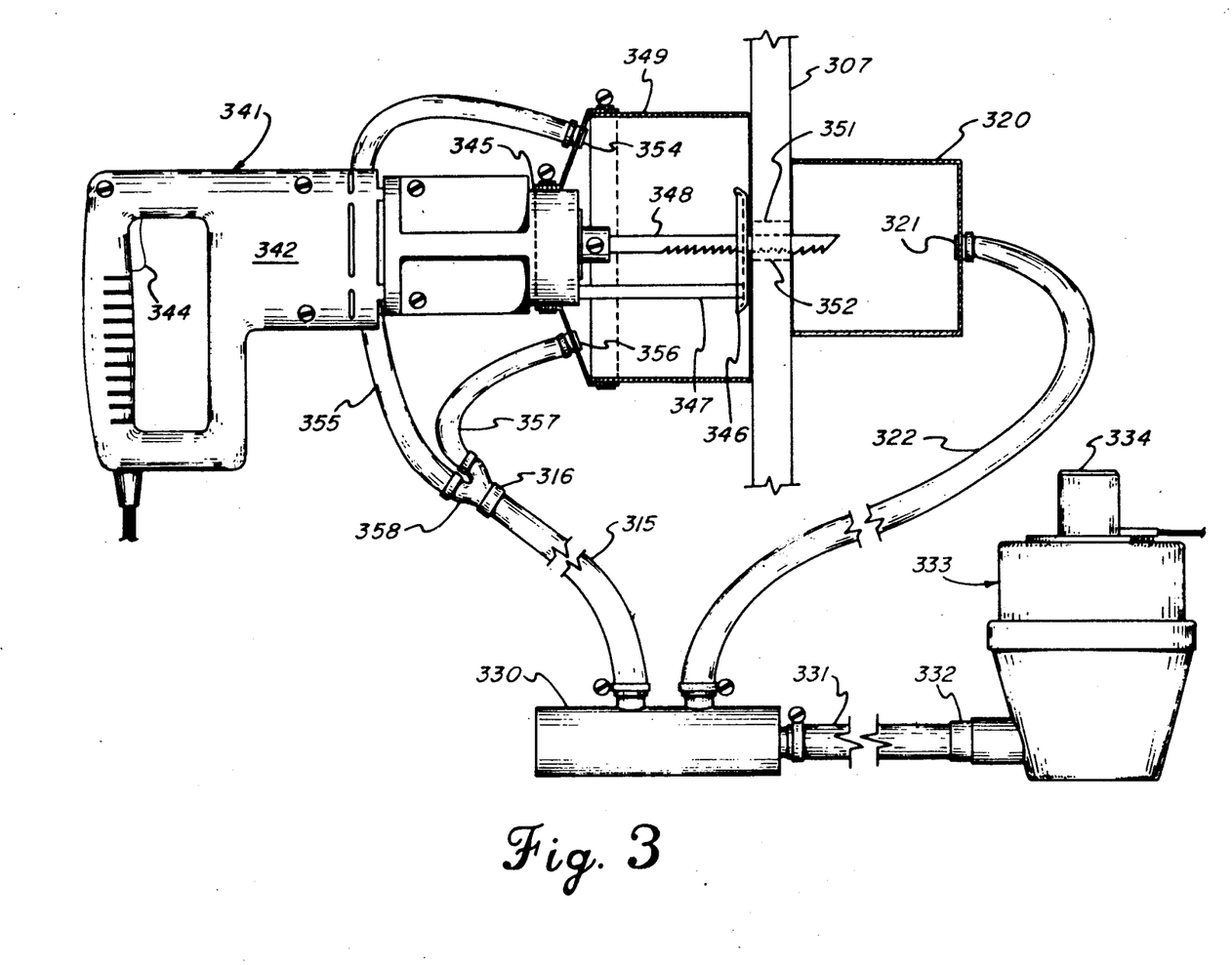
FIG. 3 illustrates, in elevation, an embodiment of the instant invention wherein a more preferred embodiment of the combination illustrated in FIG. 2 supra is utilized, which preferred embodiment has proven to be more effective when the mounting board or like is already crowded with electrical components. In such situations where there already exists a relatively high density of objects that might interfere with the vacuum hoses shown in the arrangement of FIG. 2, supra, it will be appreciated that the lower profile arrangement as shown in this FIGURE may be highly useful and desirable.

Referring now more specifically to FIG. 1, it will be appreciated that drilling means, generally illustrated at 101, is normally enclosed in a housing, generally illustrated at 102, which housing means 102 is normally provided with a handle, herein illustrated as modified pistol grip 103. An actuating device, herein illustrated as trigger 104, is utilized to turn drilling means 101 on and off as desired. Although not shown, other features of drilling means 101 include either a self-contained battery pack and/or a power cord for connection with building power. As is well appreciated by those skilled in the art, the drive means, not shown, but usually contained within housing means 102 of drilling means 101 usually terminates in drill bit chuck means, herein illustrated generally at 105, which chuck means 105 holds drill bit, generally illustrated at 106. As shown, drill bit 106 is positioned on the attack or target side of mounting board 107. First cowling means, which is utilized in combination with drilling means 101, is herein generally illustrated at 111. First cowling means 111 comprises first member 112, shown generally in sealable engagement with a portion of housing means 102 of drilling means 101. Second member 113 of first cowling means 111 is shown in slidable engagement with first member 112 and positioned with one generally open end thereof juxtaposed the target side of mounting board 107. In the embodiment of the instant invention shown in FIG. 1, both first member 112 and second member 113 of first cowling means 111 is material constructed of transparent, rigid plastic, thusly the relative position of drill bit means 106 may be easily ascertained by the operator, not shown, of drilling means 101. It will be appreciated that such depiction via transparent material here and in FIGS. 2 and 3, infra, also greatly facilitates illustration of the instant invention. As illustrated herein, first member 112 is arranged to be in slidable engagement inside second member 113 and in the most preferred embodiment of the instant invention both first member 112 and second member 113 are understood to be generally cylindrical in cross section. It will be understood that the difference in dimension, between the outside diameter of first member 112 and the inside diameter of second member 113, may be predetermined with substantial discretion and latitude so long as the cross sectional area, provided by the differences in such diameters, is not substantially greater than the cross sectional area of aperture 114, provided as herein shown in the side wall of second member 113, to provide flow communication with non-collapsible vacuum hose 115 effected by releasable connecting means 116. In operation and practice of the instant invention, it has been determined that when such differences in diameters are relatively small, so as to provide some degree of frictional resistance in the engagement of first member 112 within second member 113, positioning of the combination of drilling means 101 and first cowling means 111 is substantially facilitated, thereby enabling the operator to easily accomplish same while properly orientating drill bit means 106 relative to the target position on mounting board 107. In the operation of drill bit 106 under conditions wherein the fit between first member 112 and second member 113 is fairly close as described above, it has been found necessary to provide means for ingress of sweep air in paths directing same over chuck means 105 and thence over that portion of th drill bit furthest removed from engagement with mounting board 107. This provision has been found to be important to the practice of the instant invention in order to ensure substantially no buildup of drill cuttings or dust over that shank portion of bit 106 and/or chuck means 105. Accordingly, relatively small sweep air apertures 117 and 118 are shown provided in the wall portion of first member 112 and located at or near its engagement with housing 102. It has been found that sweep air apertures 117 and 118 are best located approximately 180 degrees apart and are provided with a diameter of approximately ⅛ inch. It will be understood, of couse, that an additional plurality of like apertures can be employed or alternatively the sealable engagement of first member 112 with housing 102 can be disposed in a manner not shown, wherein sufficient quantities of sweep air can be introduced through cut-out portions thereof. Second cowling means 120, herein shown for convenience also as material constructed of transparent plastic, is adapted for arrangement on the side of mounting board 107 opposite to its target side. For purposes of convenience of illustration and description, second cowling means 120 is also generally cylindrical in cross section and has a diameter generally similar to the diameter of second member 113 of first cowling means 111. Depending, of course, on the population, density, and relative size of components mounted on board 107, it may be convenient to provide second cowling means with a smaller or larger diameter relative to the diameter of second member 113 of first cowling means 111. Thusly, when a plurality of apertures are to be formed in mounting board 107 according to a predetermined template, it may be convenient to provide second cowling means 120 with a cross-sectional area conveniently large enough to encompass the whole of said template whereby such second cowling means so provided can be temporarily fixed as by application of duck tape to the opposite or non-target side of mounting board 107. Depending on the population density on the target side of mounting board 107, the profile of the arrangement shown in this FIG. 1, particularly that effected by releasable connecting means 116 and vacuum hose 115 may tend to interfere with the placement of second member 113. Accordingly, the direction of sweep air through first member 112 and thence through second member 113 can be reversed by utilizing one or more apertures similar to 114 as weep air inlet means, and providing or disposing two or more relatively small non-collapsible vacuum hoses, not shown, in connection with apertures provided at or near those herein indicated by 117 and 118. The resulting arrangement of two such relatively small non-collapsible vacuum hoses would present a profile somewhat similar to that illustrated in FIG. 3, infra, by apertures 354 and 356 in flow communication with vacuum hoses 355 and 357. It is to be understood that this reversed arrangement of sweep air is not the most preferred for effecting the efficient operation of drill means 101, but does present a workable alternative embodiment. As elsewhere described and herein understood, although first member 113 of first cowling means 111 is open at both ends thereof, second cowling means 120 is open only at the end thereof which is adapted for contact with the side of mounting board 107 opposite to the target side thereof. The other end of second cowling means 120, herein generally cylindrically shaped, is closed thereby providing a generally cupped shaped member which is provided as herein shown with aperture 121 in the side wall thereof, adapted for flow communication with non-collapsible vacuum hose 122. As is also elsewhere described, the flow connection effected between aperture 121 and vacuum hose 122 is normally more or less permanent in nature, whereas the flow connection effected at aperture 114 in second member 113 with non-collapsible vacuum hose 115 may preferably be in arrangement which provides for disconnecting, by releasable connecting means 116 of non-collapsible vacuum hose 115 therefrom such that non-collapsible vacuum hose 115 may be later flow connected to a later mentioned third cowling means shown in FIGS. 2 and 3, infra, either directly as shown in FIG. 2, or through utilization of manifold means as shown in FIG. 3. As noted, such connection or disconnection may be effected by releasable connecting means 116. It will also be understood that in most instances mounting board 107, herein shown to be perhaps only one or two feet on edge, usually is much larger and both disposed and dimensioned so that the operator, not shown, of drilling means 101 can neither see around nor reach the side opposite the target side, i.e., that which is first engaged by drill bit means 106. Accordingly, it is normally necessary for an operator helper (not shown) to position himself on such opposite side of mounting board 107 to secure cowling means 120 in temporary engagement with that non-target side of mounting board 107. By prearrangement of coordinates relative to landmarks on mounting board 107 such as, for instance, major components already mounted thereon or dimensions from edges thereof, the approximate location of the "punch-through" of drill bit means 106 can readily be ascertained by the operator helper to a degree of sufficient precision whereby second cowling means 120 can be temporarily positioned by, for instance, hand holding to effect practice of the instant invention. As shown, non-collapsible vacuum hoses 115 and 122 are in flow connection by means of optional manifold 130 with non-collapsible vacuum hose 131, which in turn is flow connected by means of optional adapter 132 with the filtration unit, generally herein illustrated at 133 and provided with blower means and a HEPA type filter, both generally illustrated at 134. It will, of course, be appreciated that filtration unit 133 is normally placed in operation by means of switching means, not shown, and a power supply thereto, also not shown. Accordingly, when it is desired to produce one or more apertures in mounting board 107 or the like, the arrangement herein shown is utilized whereby the emissions of particulate contamination resulting therefrom are contained within first cowling means 111 and second cowling means 120 and exhausted therefrom through non-collapsible vacuum hoses 115 and 122 through the arrangement shown for trapping of such finely sized particulate emissions by means of the HEPA filter, generally shown at 134. Thusly, neither the work area immediately adjacent mounting board 107 or the area generally surrounding same in which the operators normally function needs to be tented. Furthermore, the human operator and operator helper are not required to wear protective clothing and full face respiratory devices, it having been determined in the development of the instant invention that the more comfortable half-face respirators rather than cumbersome air line masks provide more than sufficient protection.

Referring now more specifically to FIG. 2, therein is shown an arrangement of an embodiment of the instant invention which is oftentimes utilized in sequence with the combination shown and described in FIG. 1, supra, wherein subsequent to the punching through or drilling of one or more holes in the mounting board therein described, an aperture is cut by means of a saw blade or the like inserted into one or more of such holes, or apertures. For instance, when a generally rectangular aperture needs to be provided it is oftentimes convenient to drill four holes generally defining the corners thereof and sawing therebetween. It will be appreciated, however, that the embodiment shown in this FIGURE as well as that in FIG. 3, infra, may in some instances be utilized wherein apertures already exist or the sawing commences from a position such as an outside edge of the board, wherein engagement of the blade is readily effected without a drilling operation sequenced prior thereto. Accordingly, one embodiment of the sawing means used herein oftentimes takes the form of a saber saw, as generally illustrated at 241. Saw means 241 is generally enclosed in housing means, or more simply housing 242 and may be provided with an actuating device such as trigger 244. Such a device may be provided with necked portion 245 located between the main portion of saw means 241 and base plate member 246, which base plate 246 is positioned a predetermined distance therefrom by means of base plate holder 247. Saw blade 248 is arranged to travel or reciprocate beyond the bottom portion of base plate 246, which in the above illustration, is shown urged against the target side of mounting board 207. As is customary in saber-type devices and as noted above, saw blade 248 extends a substantial distance beyond base plate 246. In practice of the instant invention, third cowling means, generally shown at 249, is positioned in sealable engagement with saw means 241 and, as shown in this illustration, conveniently engaged with necked portion 245 thereof, with the opposite and open end thereof urged against the target side of mounting board 207 in an arrangement whereby both base member 246 and a major portion of saw blade 248 are enclosed thereby. Although the cross sectional configuration of cowling means 249 may be generally circular as oftentimes is its counterpart, to wit, cowling means 111 in FIG. 1, supra, because the direction of cut in this device is essentially 90 degrees from that of drill means 101 in FIG. 1, supra, it has been found more convenient to make the cross sectional configuration of cowling means 249 and for that matter its counterpart 349 in FIG. 3, infra, generally rectangular in shape and of a size sufficient to fit over base plate 246, which itself is normally rectangular. In this FIGURE, both cowling means 249 and 220 are shown in transparent material construction whereby all of the components fitted there within are readily discernible in the respective elevations. As noted elsewhere, in order to facilitate orientation of saw blade 248 relative to the cut to be made in mounting board 207 and also to ensure that cowling 220, located on the other side of mounting board 207, is properly positioned relative to the target, such transparent material construction is a requirement of the instant invention, it being understood that in the most preferred embodiments all of said cowlings are transparent material constructed, as opposed to those instances wherein it is deemed desirable, because of other considerations, to construct only portions of said cowlings of transparent materials. It will, of course, be further understood that the arrangement shown is normally effected after an aperture, either a drilled hole or cut slit, is provided in mounting board 207, one such hole herein generally illustrated by broken lines 251 and 252, to thereby accommodate the portion of saw blade 248 which is shown to extend beyond the bottom portion of base plate 246. As referenced above, some of the embodiments of this invention are provided with releasable connecting means between the apertures provided in the cowlings and their respective non-collapsible vacuum hoses. Accordingly, in the instant illustration, it will be appreciated that aperture 214, provided in the side wall of cowling means 249, is in flow connection with non-collapsible vacuum hose 215, which vacuum hose 215 may be in interchangeable, interconnecting relationship via releasable connecting means 216, with aperture 114 in FIG. 1, supra. Thusly, vacuum hose 115 in FIG. 1 can be the same hose represented here in FIG. 2 as 215. Likewise, cowling 220 and aperture 221, provided in the side wall thereof, which aperture 221 is in flow connection with non-collapsible vacuum hose 222, oftentimes are the same device illustrated and described in FIG. 1, supra, as cowling 120, aperture 121, and non-collapsible vacuum hose 122. In view of the foregoing, it should be appreciated by those skilled in the art that the description and functioning of the remaining elements in this combination, to wit, optional manifold 230, vacuum hose 231, and filtration unit generally illustrated at 233, having optional attendant adapter means 232, as well as a HEPA type filter and blower shown at 234 are as described above for the respective counterparts in FIG. 1.

Referring now more specifically to FIG. 3, therein is shown an arrangement of the instant invention similar to that described in FIG. 2, supra, but with modifications to the relative positions of the vacuum hoses attendant the respective cowlings to provide units which may be fitted into tighter or smaller spaces on mounting board 307. Accordingly, the elements of the sawing means, the respective cowlings, and that portion of the particulate removal system from the juncture of the two main non-collapsible vacuum hoses into the aforementioned manifold means, and thence to and through the filtration unit are subsequently as described in FIG. 2, supra. In the instant embodiment, a modification has been made to cowling 320 by locating aperture 321 in flow communication with vacuum hose 222 in the closed end wall thereof, rather than in the side wall, as shown at 121 and 221 of FIGS. 1 and 2, respectively. In addition, cowling 349, which is in sealable engagement with saw means 341, has two apertures 354 and 356 provided in or near the end wall or portion thereof furthest removed from the open end, the aperture of which open end defines a plane generally coincident with the bottom portion of base member 346. As shown, apertures 354 and 356 are in flow connection with non-collapsible vacuum hoses 355 and 357, respectively, both of which optionally union in manifold 358 to which non-collapsible vacuum hose 315 is flow connected via releasable connecting means 316. As noted supra, vacuum hose 315 may or may not be identical to hose 215 or 115 of FIGS. 2 and 1, respectively. In such an arrangement, it will be appreciated that the diameter of vacuum hoses 355 and 357 may be smaller than that of 315 to thereby allow the overall dimension of cowling 349 to likewise be reduced in size so as to permit fitting into tighter portions of mounting board 307 on the attack side thereof.

DETAILED DESCRIPTION OF THE PREFERRED EMBODIMENT

The present invention comprises a new, simple, effective, efficient and safe method and means for effecting protection of human operators against the deleterious health hazards normally caused by the effects of airborne asbestos fibers and certain other fine particulate contamination. The instant invention relates to limiting occupational exposure to asbestos, either of the chrysotile or the amphiboles type, as well as other particulates characterized as carcinogens and deemed by toxicologists as being responsible for effecting a high incidence of life-threatening lung ailments—in particular lung cancer and mesothelioma, a fatal cancer that appears to strike only those who have inhaled asbestos or other similar fiber. More particularly, it relates to methods and means for efficiently and effectively containing and lowering the level of such particulate contamination in an area that is environmentally in communication with a source generating a high level of a variety of particulate contamination harmful to the human body either on a short term or long term basis. Still more particularly, it relates to the practice of a technique, as well as equipment attendant therewith, which is substantially suitable to aid in the protection of the persons actually in an area generating a high level of such particulates such as, for instance, where ebony-asbestos boards must be drilled or sawed for the removal, mounting, or other installation of electrical equipment components thereon, which components necessarily function best because of the electrical insulation characteristics exhibited by such asbestos containing substrates. More specifically, it relates to the use of specially designed apparatus and involves the use of a plurality of, most preferably, transparent cowling means which are specially designed for operative association with a variety of drilling and/or sawing means, including commercially available hand held drills and saber saws used in the machining of such asbestos containing materials.

In the most preferred embodiment of the present invention, three such cowling means are utilized. More specifically, a first and second cowling means are used in operative association with the drill and a combination of said second cowling means and a third cowling means are used with the saw. The first cowling means generally comprises two members adapted to be in relative movement association with one another during the drilling operation and disposed generally between the drill housing and the target side of the mounting board or other like asbestos containing material. The second cowling means is generally disposed on the side of the mounting board, which is opposite to said target side and therefore separated from said first cowling means by the thickness of said mounting board. The third cowling means is utilized in operative association with the saw. During practice of the present invention, at any given time, at least two and sometimes all three of such cowling means are operatively associated with at least one filtration unit flow connected therewith and with a blower to pull air into the specially designed cowlings and thence into the filtration unit wherefrom the resulting filtered air is exhausted to the atmosphere, with said cowling means being connected thereto usually by means of non-collapsible vacuum hoses affixed, either permanently or releasably connected, usually (but not always) to the side wall thereof.

The at least one filtration unit normally utilized in the practice of the instant invention is a HEPA filter, preferably of the type characterized as having a 99.99 percent efficiency of 0.3 micron material. Such filter is used in conjunction with a high-performance vacuum cleaner disposed in operative association therewith and provided with a blower unit characterized by a propensity to develop and provide substantial airflow and pressure differential through and across said HEPA filter unit.

In order to accommodate the travel of the drill bit, the first cowling means operatively associated with said drilling means comprises two members slidably disposed relative to one another, with the first member thereof being more or less substantially fixed relative to the drill housing and the second member adapted to be fitted temporarily to the target side of the mounting board or other member to be drilled. In the preferred embodiment of the instant invention, said second member of said first cowling means is provided with means for effecting the flow connection with said at least one filtration unit. Normally a second cowling means, also flow connected to said filtration unit, is operatively associated with the instant apparatus and is fitted temporarily (usually hand held by the operator helper) to the side of the material which is opposite to that first targeted for engagement with the drill bit of said drilling means. A third cowling means, also flow connected to said filtration unit, is operatively associated with the sawing means which sawing means may be utilized after holes are drilled in the target mounting board, or the like, and is generally fixed relative to the housing thereof. One end of said third cowling means is open to fit over the base plate of the saw, normally of the saber type, and defines a plane substantially parallel to the plane of the target board. Likewise, one end of the second cowling is generally open ended, with the plane defined thereby also disposed generally parallel to the major planes of the mounting board, or like. It is important that all three cowlings be constructed of material that is stiff, and/or resilient enough to withstand the substantial pressures that may be developed therearound due to the pressure differentials developed by operation of the associated filtration unit. It is also important to the efficient and effective operation of the instant invention that at least portions of all three such cowling members or units be constructed of material which is transparent, thereby enabling the drill or saw operator to observe the positions of either the drill bit or saw blade relative to the target, and to enable such operator to easily and readily effect proper orientation and/or positioning therebetween. It will also be appreciated that provisions may be made such that the flow connections with the at least one filtration unit and the first and third cowling means are arranged or constructed such that they are, or can be removably connected therefrom. In such manner, after the holes are drilled and the drill is put aside, the vacuum hose connected to the second member of the first cowling means may be removed therefrom and connected, with the aid of suitable releasable connecting means to said third cowling means. Also, in the preferred embodiment of the instant invention, the vacuum hose and the second cowling means, which is normally used on the backside of the board or plate to be drilled and/or sawed to capture particulate material forced therethrough by either the drill bit or blade, is utilized in combination with both the drill and the saw, or other machine tool. Accordingly, there usually is no need to effect a disconnection between said second cowling means and said at least one filtration unit. Thus, either three separate vacuum hoses may be used, or more preferably, two vacuum hoses are utilized with a switching between the first and third cowling means being effected through the use of releasabe connecting means, if and when it is deemed desirable to follow the drilling procedure with a sawing operation.

While I have shown and described particular embodiments of my invention, modifications and variations thereof will occur to those skilled in the art. I wish it to be understood, therefore, that the appended claims are intended to cover such modifications and variations which are within the true scope and spirit of my invention.

What I claim as new and desire to secure by Letters Patent of the Unites States is:

1. An improved, tent-free particulate contamination control system for effecting protection of human operators against the deleterious health hazards normally caused by the effects of certain airborne fine particulate contamination, including asbestos fibers, said human operators having occasion to work in an area that is environmentally in communication with a source, including drill bit means for generating a high level of such particulate contamination, said system comprising:

drilling means for effecting the formation of apertures in at least one plate member comprising materials that are characterized by a readily determinable content of material that has been determined to be carcinogenic when inhaled by humans and further characterized as being friable, said drilling means including drill bit means, drill bit drive means, and drill housing means for generally enclosing at least a portion of said drill bit drive means;

first cowling means comprising a first elongated, hollow member generally open at one end thereof and adapted at the other end thereof for sealing engagement with said drill housing means and a second elongated member generally open at both ends thereof with at least the first such generally open end having a peripheral configuration complementary to the cross-sectional dimensions of said open end of said first elongated member and adapted for slidable engagement therewith and the second such generally open end of said second elongated member generally defining a plane substantially parallel to said plate member;

second cowling means comprising an elongated, hollow member being generally closed at one end thereof and an aperture at the other end thereof, said aperture defining a plane substantially parallel to said plate member, and at least one filtration unit operatively associated with both said first and second cowling means and flow connected therewith by means of non-collapsible vacuum hoses, said at least one filtration unit operatively associated with blower means adapted to pull air into said cowling means and thence into the at least one filtration unit wherefrom the resulting filtered air is exhausted to the atmosphere.

2. The improved, tent-free particulate contamination control system of claim 1, wherein said cowling means are non-collapsible material constructed to resist deformation attendant the pressure differential effected by operation of said at least one filtration unit, with at least a portion of said second member of said first cowling means being transparent material constructed to facilitate orientation, by the drill means operator, of the drill bit means relative to the target position of said plate member.

3. The improved, tent-free particulate contamination control system of claim 2, wherein at least a portion of both members of said first cowling means are transparent material constructed to facilitate such orientation.

4. The improved, tent-free particulate contamination control system of claim 3, wherein at least a portion of said second cowling means is transparent material constructed to facilitate such orientation.

5. The improved, tent-free particulate contamination control system of claim 2, wherein said at least one filtration unit operatively associated with both said first and said second cowling means is adapted to be flow connected with said second member of said first cowling means.

6. The improved, tent-free particulate contamination control system of claim 5, wherein said first member of said first cowling means is adapted to slide inside said second member thereof.

7. The improved, tent-free particulate contamination control system of claim 6, wherein said at least one filtration unit operatively associated with both said first and second cowling means is flow connected therewith through the side walls thereof.

8. The improved, tent-free particulate contamination control system of claim 7, wherein said at least one filtration unit operatively associated with both said first and second cowling means is flow connected therewith through the side wall of said first member of said first cowling means and through the generally closed end of said second cowling means.

9. The improved, tent-free particulate contamination control system of claim 6, wherein the peripheral configuration of said first cowling means is generally circular.

10. The improved, tent-free particulate contamination control system of claim 9, wherein the peripheral configuration of said second cowling means is generally circular.

11. A device for effecting tent-free particulate contamination control and protection of human operators against the deleterious health hazards normally caused by the effects of certain airborne fine particulate contamination, including asbestos fibers, said human operators periodically having occasion to work in an area that is environmentally in communication with a source, including drill bit means for generating a high level of such particulate contamination, said device comprising:

means for drilling apertures in at least one plate member, said plate member having a determinable target side and comprised of materials that are characterized by being carcinogenic when inhaled by humans and further characterized as being friable, said means for drilling comprising;

drill bit means, drill bit drive means, and drill housing means for generally enclosing at least a portion of said drill bit drive means;

a first cowling comprising;

a first generally elongated and hollow member open at one end and adapted at its other end for sealing engagement with said drill housing means, and a second generally elongated and hollow member open at both ends with at least the first open end having a peripheral configuration complementary to the cross-sectional dimensions of said open end of said first elongated member and adapted for slidable engagement therewith and the second open end of said second member generally defining a plane substantially parallel to said plate member and adapted for temporary engagement with the target side of said plate member;

a second cowling comprising;

a generally elongated and hollow member being generally closed at one end and being provided with an aperture at its other end, said aperture defining a plane substantially parallel to said plate member and adapted for temporary engagement with the side of said plate member opposite to said target side; and at least one filtration unit comprising;
- a first non-collapsible vacuum hose operatively associated with said first cowling,
- a second non-collapsible vacuum hose operatively associated with said second cowling,
- a HEPA type filter flow connected with said first and said second non-collapsible vacuum hose, and
- a blower means operatively associated said filter and adapted to pull air into said cowling means and thence into said filter wherefrom the resulting filtered air is exhausted to the atmosphere.

12. A device according to claim 11 wherein at least a portion of said second member of said first cowling is transparent material constructed to facilitate orientation of the drill bit means relative to the target position of said plate member.

13. A device according to claim 12 wherein said first non-collapsible vacuum hose is adapted to be flow connected with said second member of said first cowling.

14. A device according to claim 13 wherein said first member of said first cowling is adapted to slide inside said second member.

* * * * *